United States Patent
Henry et al.

(10) Patent No.: US 7,420,482 B2
(45) Date of Patent: Sep. 2, 2008

(54) METHOD OF ENCODING AND PLAYING BACK AUDIOVISUAL OR AUDIO DOCUMENTS AND DEVICE FOR IMPLEMENTING THE METHOD

(75) Inventors: Jean-Baptiste Henry, Melesse (FR); Michel Cosmao, Liffre (FR)

(73) Assignee: Thomson Licensing, Boulogne Billancourt (FR)

( * ) Notice: Subject to any disclaimer, the term of this patent is extended or adjusted under 35 U.S.C. 154(b) by 653 days.

(21) Appl. No.: 11/158,754

(22) Filed: Jun. 22, 2005

(65) Prior Publication Data

US 2006/0007479 A1 Jan. 12, 2006

(30) Foreign Application Priority Data

Jul. 6, 2004 (FR) .................................. 04 51463

(51) Int. Cl.
*H03M 7/34* (2006.01)
(52) U.S. Cl. .............................. 341/51; 341/50; 341/55
(58) Field of Classification Search .................. 341/59, 341/67, 65, 58, 50, 51, 94; 725/131, 132; 386/1, 45, 46
See application file for complete search history.

(56) References Cited

U.S. PATENT DOCUMENTS

| | | | |
|---|---|---|---|
| 6,278,387 B1 * | 8/2001 | Rayskiy | 341/61 |
| 6,480,123 B2 * | 11/2002 | Tsutsui et al. | 341/50 |
| 6,545,615 B2 * | 4/2003 | Kahlman et al. | 341/59 |
| 6,903,666 B2 * | 6/2005 | Koto et al. | 341/50 |
| 7,233,267 B2 * | 6/2007 | Sako et al. | 341/58 |
| 2003/0066084 A1 | 4/2003 | Kaars | |
| 2003/0233663 A1 | 12/2003 | Rao et al. | |

OTHER PUBLICATIONS

European Search Report, FR 0451463 Jan. 27, 2005.

* cited by examiner

*Primary Examiner*—Brian Young
(74) *Attorney, Agent, or Firm*—Joseph J. Laks; Paul P. Kiel

(57) ABSTRACT

The invention can be used to play back an audiovisual or audio document received in a first encoding format within a local area network. A first device plays back the document in the received format, then a user decides to play back the document on a device having a second encoding format. Playback is first stopped on the first device and the document is stored. The user starts playing back the document on the second device at the moment at which playback of it was stopped on the first device. Depending on the decoding means of the second device, the document is transcoded from the first encoding format to the second encoding format. The invention also relates to a management device for issuing storage and transcoding requests so that a document played back from a first device can be transferred to a second device regardless of the capabilities for playing back encoded documents on the first and second devices.

13 Claims, 2 Drawing Sheets

METHOD OF ENCODING AND PLAYING BACK AUDIOVISUAL OR AUDIO DOCUMENTS AND DEVICE FOR IMPLEMENTING THE METHOD

This application claims the benefit, under 35 U.S.C. § 119 of French Patent Application 04/51463, filed Jul. 6, 2004.

FIELD OF THE INVENTION

The invention relates to a method of encoding and playing back an audiovisual or audio document within a domestic network, and to a device incorporated in a domestic network for implementing the method.

BACKGROUND

When they are transferred and stored, the audiovisual documents are encoded and therefore compressed. The purpose of compression is to reduce the size of the document so that it can be sent more rapidly and so that it occupies less space when stored. These days, there are numerous video, audio or audio/video encoding algorithms. Those relating to video include MPEG2, MPEG4, H263, H264, etc. The encoding algorithms differ according to characteristics such as: their compression ratio which determines the size of the document, the computation capability required, the speed of encoding and decoding, the quality obtained on playing back the compressed document, and so on. Depending on the type of medium used to store the work, the algorithm and the encoding parameters are not the same. At the time of playback, the playback device reads the encoding parameters of the document in order to determine which decoding algorithm to use. If the device does not have the decoding means, it returns an error message to the user.

In a home network context, the playback devices are linked to devices for reading and/or storing audiovisual documents. Communication within the network is conducted via cables or wirelessly, but in both cases, a protocol known to all the devices enables each message sent to be received and processed by the right recipient. These devices are used in the multimedia field, for example: a television receiver, a video recorder, a DVD player, a decoder, an amplifier, an audio CD player, and so on. Some devices have a means of communicating with an external network, such as the Internet, via an interface linked to the telephone network or a high speed network. The network devices are normally made by different manufacturers and therefore have incompatible encoding and decoding algorithms. Because of this, the choice of an audiovisual or audio document is based on the type of decoding algorithm that can be executed by the playback device.

A network commonly incorporates a number of playback devices. For example, each room in the home has a terminal. A number of receivers receive documents from a number of transmission networks. The communication network has a number of storage devices of different types, such as a digital video recorder and a hard disk. Network management can be handled centrally using a control device or be distributed, with each device having the capability to control the network in turn.

Documents intended for display have attributes that enable them to be identified. The identifier of a broadcast is typically its title and its transmission channel, this information being displayed via an electronic program guide (EPG). The user can select a broadcast and watch it on a screen. Systems in which a user can move to another room and watch the same broadcast on another screen are known. For this, the user has a personal electronic badge. This badge is connected to the terminal that the user is currently using, for example to watch a broadcast transmitted on a particular television channel. When the user leaves a terminal, he removes his badge and the latter stores the current task. Then, when the user starts a session with a new terminal, he connects his badge which automatically transmits the characteristics of the last task requested by this user, so the new terminal displays the same broadcast as previously.

This "follow-me" application enables a user to have the playback of a particular document follow him as he moves from one device to another within a network. However, it is essential for all the devices to have the decoding algorithm corresponding to the encoding of the document. If a device does not have this algorithm, it cannot display it and therefore the screen appears black to the user. One of the advantages of the present invention is to overcome this problem by making it possible for any playback device selected by the user to be able to display the audiovisual document. The "follow-me" application is in particular described in international patent application WO03/067594 filed by UCENTRIC Holding, Inc.

Patent application U.S. 2003/0066084 published on 3 Apr. 2003 relates to a system for transcoding a document passing through a network. A first device stores a document in a first format, then a second device transcodes the document in a second format to make it compatible with the playback unit.

SUMMARY OF THE INVENTION

One object of the present invention is a method of playing back an encoded audiovisual or audio document, comprising the following steps:
  playing back the document received in a first encoding format in a first device of a communication network,
  stopping playback on the first device activating storage of the document in a network device, wherein it also comprises the following steps:
  entering on a first device an identifier of a second device for continuing playback of the received document,
  testing whether the second device accepts the first encoding format and, if it does not, executing the following two steps:
  searching for a device for transcoding the document from a first encoding format into a second encoding format compatible with the second device,
  activating the transcoding device for transcoding the document in the second format so that it can be played back on the second device, and on the second device:
  detecting the presence of a user initiating the resumption of playback at the point at which it was stopped.

In this way, if a document is not encoded in a format compatible with the new playback device, the network will automatically look for a device able to transcode it into a compatible format. At the moment when playback is stopped on the first device, an identifier of the second device is entered on the first device. In this way, the method knows the second device and deduces from this its decoding capabilities and can prepare transcoding immediately the user has stopped playback.

A refinement consists in having the size of the document encoded in the first format and that of the document encoded in the second format compared, transcoding being performed before storage when the document encoded in the second format occupies less space than the document encoded in the first encoding format. In this way, the storage size is reduced and the communication bit rate is limited.

Another refinement consists in choosing the first device in preference if it has storage capabilities. Another refinement consists in choosing a device which can both store and transcode, as a way of limiting communications within the network.

Another refinement consists in having the user enter his identifier. This means that, in a multi-user context, the document can be played back for the same user.

Another object of the present invention is a device for managing a network receiving information indicating that a first device is playing back a document in a first encoding format, wherein it comprises:

- a first means of receiving a command to stop playback of the document on the first device, initiating storage of the document in a network device,
- means of receiving, on the first device, a command to select a second device to continue playback of the document, said device having at least one means of decoding in at least one second format,
- a means of detecting the presence of a user on the second device initiating the resumption of playback at the point at which it was stopped,
- a means of comparing the decoding formats of the second device with the first format, if the second device does not accept the first encoding format, then the management device searches for a means of transcoding the document from the first encoding format into a second encoding format compatible with the second device, activates said transcoding means and a means of transmitting the transcoded document to the second device.

BRIEF DESCRIPTION OF THE DRAWINGS

Other features and advantages of the invention will now become apparent with more details from the description that follows of exemplary embodiments, given by way of illustration with reference to the appended figures in which.

DETAILED DESCRIPTION

Figure 1:
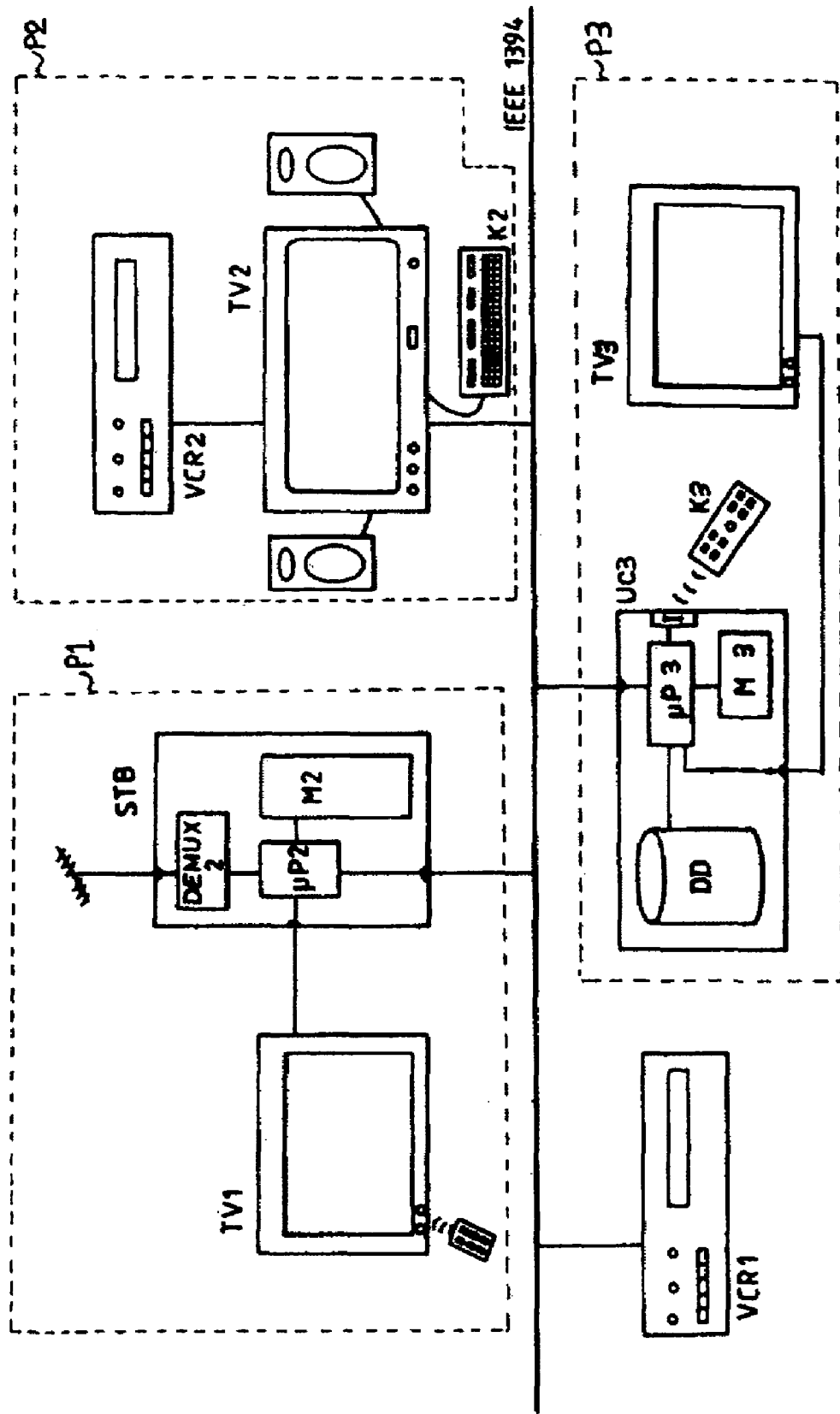
FIG. 1 is a diagram of a domestic network for implementing an exemplary embodiment of the invention.

A digital communication network according to a present exemplary embodiment is described in FIG. 1. This network comprises, for example, the following devices:

- an STB decoder with a processing unit (μP2), a memory (M2) for storing audiovisual documents, a tuner and a demultiplexer DEMUX2 for receiving documents transmitted over a transmission network, and a connection with a television screen TV1. This assembly is placed in a room P1 of the home, the kitchen for example, and is equipped with an MPEG2 decoder.
- an interactive television screen TV2, provided with an alphanumeric keyboard K2, and connected to a video recorder VCR2, this system possibly being used as a terminal to enter commands in the network. This assembly is placed in a room P2 of the home, the lounge for example. This element is equipped with an MPEG4 decoder and an H263 decoder, and a CD-ROM player/burner.
- an audiovisual system comprising a processing unit UC3, a program memory M3, and a high capacity hard disk for storing audiovisual documents, or pictures. The central processing unit is also connected to a television screen TV3. This assembly is placed in a room P3 of the home, the parents' bedroom for example. A similar assembly can also be installed in the children's bedroom. The system is equipped with an MPEG4 codec. A codec is an algorithm which is a combination of an encoder and a decoder.
- a video recorder that can be accessed only via the network.
- a hi-fi system (not shown) including a central processing unit, a hard disk for storing audio documents only (in the form of MP3 files, for example) and a playback unit for listening to the audio documents. This element is equipped with an MP3 decoder.
- a modem (not shown) enabling the network to access an external network, the Internet for example, via a telephone link.

All these devices are interlinked by a digital bus using, for example, the IEEE 1394 standard, or the "802.11 home subnetwork 2" standard. The IEEE 1394 standard is described in the document "IEEE1394 Standard for a High Performance Serial Bus", the basic version of which dates from 1995 and the latest version of which is "1394a" published in 2000. The IEEE802.11 standard is described in the document "Standard for Information Technology—Telecommunications and Information Exchange between Systems—Local and Metropolitan Area Network—Specific Requirements—Part 11: Wireless LAN Medium Access Control (MAC) and Physical Layer (PHY) Specifications" first published in 1999, followed by other published versions: 802.11b/a/g/h/i/etc.

At least one network device comprises an "automatic document tracking management" application or GASD, one function of which is to manage the reading of a document from a device and the playback of it on another device selected by a user. The GASD application issues requests to all the devices in the network and can specify which tasks they are required to carry out. The GASD application is also capable of analysing the format of the document stored in a first device in order to find a means of adaptation so that it can be played back on a second device.

Figure 2:
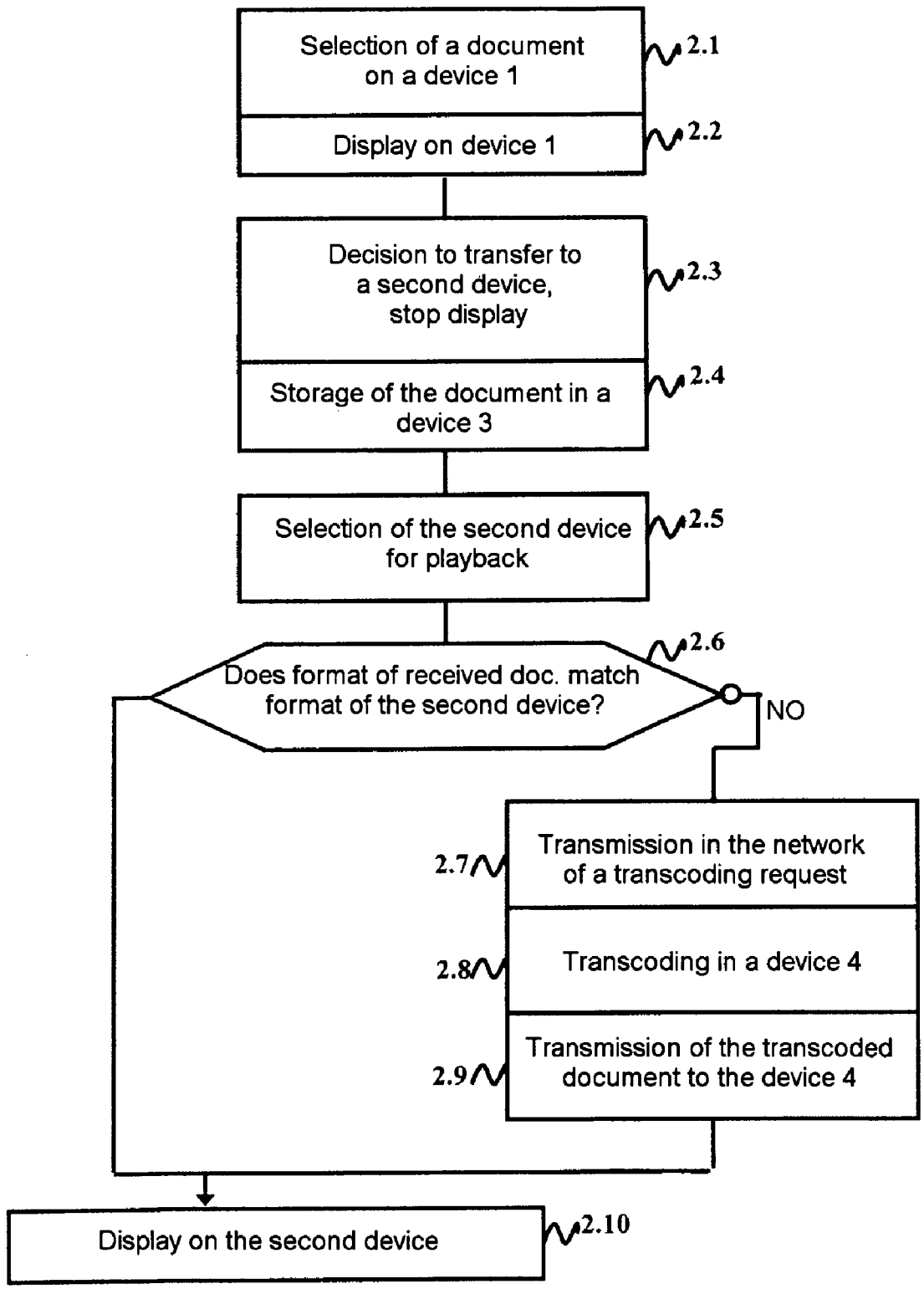
FIG. 2 represents a flow diagram of the various steps of the method according to an exemplary embodiment of the invention.

FIG. 2 shows the various communications and steps carried out between the devices while playing back an audiovisual document according to an exemplary embodiment of the invention. First of all, the user switches on a network device and runs from it, an EPG for selecting either an audiovisual document available on a transmission network, or a transmission channel, or a service if the network is digital. In FIG. 2, the user receives the channels, service and audiovisual documents via satellite, but this means does not preclude receiving them via a cable, or via a communication network such as the Internet. The GASD application checks the compatibility between the device containing the EPG and the encoding format of the document. Normally, compatibility is assured because the program guide that can run on a device displays only those documents that it can play back. For this, all that is needed is for the decoding software corresponding to the encoding format of the document presented to be present in the device. The document arrives over the domestic network via a receiver, and is routed to the playback device that allowed it to be selected and where it is played back.

Now let us assume that the user decides to change rooms; he stops viewing on his device and asks for the selected document to follow him to another room. The GASD application then looks in the network for a storage means in which to temporarily store the document which continues to arrive from the transmission network. This storage means is preferably a hard disk implemented in a network device. This type of storage enables a document to be both stored and then read at any moment in the recording. According to a preferred embodiment, the document is stored as it is received, that is, in the same encoding format. The user goes into another room of the home and asks the GASD application to transfer his document. The GASD application then analyses the decoding and playback resources of the new device. For this, the GASD application has access to a table of the decoding resources of each device in the network. Another method consists in, when the user reactivates playback on the second device, having the latter send to the GASD application a list of its decoding algorithms. If the second device has the same decoding software corresponding to the encoding format of the previously selected document, the GASD application sends a read command to the storage means and the data read is routed to the new device which decodes it and plays it back for the user.

If the second device does not have the same decoding software corresponding to the encoding format of the document previously selected and currently being stored, the document cannot be played back without transcoding, that is, without generating a new block of data for reading the same document using a new decoding algorithm. Assume, for example, that the document is in a format F1, and the new device (the second device) has a decoding software list in the format: $F2_1$, $F2_2$, $F2_3$, etc. The GASD application then sends two requests to all the devices in the network, asking for:

1st request: an available device for temporarily storing an audiovisual document, 2nd request: a device having software for transcoding from the format (F1) to one of the formats ($F2_1$, $F2_2$, $F2_3$, etc.).

The first request is unnecessary if the device on which the EPG is running already has a temporary storage means. In a general case, let us assume that two devices respond to both requests: a third device for temporarily storing the document, and a fourth for transcoding. This fourth device responds to the effect that it has software for transcoding, for example, from the format F1 to the format $F2_2$. The GASD application then issues the following requests:

to the first device (the starting one for the user): a request to send the selected document over the network to the second device, to the third device: a request to store the document originating from the first device, to the fourth device: a request to read the document read from the third device, a request to transcode this document into the format $F2_2$, and a request to route the document in the format $F2_2$ to the second device selected by the user. These three requests are sent by the GASD application when the user asks to continue viewing on a second device. It is at this moment that the GASD application knows which device will continue with the playback, to the second device: a request to play back the document received in the format $F2_2$. This request is sent when the user asks to continue viewing on a second device.

Let us assume, for example, that a playback device displays only MPEG2 type documents, but the document selected by the user is received and temporarily stored as a half-size MPEG4 type. Then, a network device must receive the stream in half-size MPEG4 format and transcode it to MPEG2. The audiovisual signals can be transmitted within a heterogeneous network. For example, transmission from the first device to the third device (the storage device) is conducted via a 1394 link. Let us now assume that the user asks to continue playback on a terminal linked by Ethernet; the GASD application specifies in its requests the transmission mode and chooses a fourth device (transcoding device) provided with two communication means: 1394 for receiving the document encoded in the first format and Ethernet for sending the document in the second format.

If several responses to the requests arrive at the GASD application, a choice must be made. If the same device can both store and transcode, the GASD application chooses it in preference because this limits the communications. Similarly, if the first device can also store the document, it is chosen in preference for this function.

If the second device informs the GASD application that it has a number of decoding algorithms (all incompatible with the encoding format of the document received by the first device), then unless expressly requested by the user, the GASD application chooses the decoding format for which the encoded document occupies the least space.

The GASD application can manage a number of requests originating from several users planning to change rooms and wishing to have a document being viewed follow them. When a new user switches on a device in the network, he needs to identify himself either by entering a number, or by connecting to the device a personal and portable electronic object containing his identifier. Similarly, when a new device is added to the network, it communicates its requirements in encoding terms to the GASD application. To manage these requests, the GASD application updates a table in the working memory of the device containing the application. According to one exemplary embodiment, the table contains at least the following data:

TABLE 1

| | User 1 | User 2 | User 3 | User 4 |
|---|---|---|---|---|
| Document identifier | Star Wars/ Channel 1 | Friends/ Fox Channel | News on Channel 5 | — |
| Format of received document | MPEG4 | MPEG4 | MPEG2 | — |
| Currently being displayed | 1 | 0 | 1 | |
| Storage device | — | Decoder Lounge | Decoder Lounge | |
| Device containing the transcoder | — | — | Decoder Kitchen | |
| Transcoding flag | 0 | — | 1 | — |
| Playback format | MPEG4 | — | MPEG4 | — |
| Device for playback | Television in lounge | — | Screen Kitchen | — |

The data in this table illustrates the situation of the document streams at a given time. The user 1 has selected his program in the lounge, and because he has not moved since, there is no need to transfer playback of the document to another room. The users 2 and 3 have changed rooms. There is no point in retaining the original device. The user 2 has selected a document in MPEG4 format, as is shown by the display flag, he has stopped viewing and asked for the document to be transferred. The application has asked the lounge decoder to temporarily store the document, the other data is not updated for the moment, and will be when the user has specified the playback device. The user 3 has selected a document in MPEG2 format which is temporarily stored in the kitchen decoder. The display flag is active, the display device is the one in the kitchen. The playback format is MPEG4, and the transcoding flag is active. It can be seen that the transcoding device is the decoder in the kitchen. Thus, the document received in the MPEG2 format is sent to the decoder in the lounge which stores it and at the same time sends it with a certain time offset, to the decoder in the kitchen, where it is transcoded and finally displayed on the screen in the kitchen. As for the user 4, he is recognized by the GASD application, but for the time being has selected no document. In a multi-user context as shown by table 1, the user arriving in a new room and activating a second playback device must identify himself to that terminal in order for the GASD application to send him the right document.

FIG. 2 is a flow diagram of the various steps of the method according to an exemplary embodiment of the invention.

In the step 2.1, the user selects a document from a first device of a home network and views it (step 2.2). Some time later, the user decides in the step 2.3, to leave the room where he is viewing the document and orders this document to be transferred to a second device in the network which does not need to be specified at this stage of the program. The GASD application issues a storage request and activates storage of the document received in a third device (step 2.4). The user changes rooms and activates a second device where he wants to continue playback of the document at the point at which it was stopped in the device 1 (step 2.5). The GASD application is then notified by the network of the identity of the second device, knowing its resources, in the step 2.6 the GASD application tests by analysing the data in table 1 to see whether this device is capable of playing back the document as it is stored in the device 3. If it is not possible, the GASD application sends a transcoding request to another device in the network (step 2.7). In the step 2.8, a fourth device has accepted the request, it transcodes the document sent by the third device and sends the document data in the new format to the device 2 (step 2.9). Finally, the application skips to step 2.10 for viewing the document in the right format on the device 2. If, in the step 2.6, the GASD application determines that the document can be viewed directly without transcoding by the device 2, the program skips directly to the step 2.10.

Advantageously, the third device has, in addition to a storage means, a transcoding means. This way, the third device responds to both the storage and transcoding requests from the GASD application. Thus, when the user has indicated that he wants to resume viewing at the moment at which it was stopped in the first device, this document is read and transcoded by the same device, which eliminates the need for the transfer between the hard disk and a transcoding device and saves on network bandwidth.

A variant consists in having the user nominate the device on which he wants to continue viewing his document at the moment when he leaves the room. Thus, the second device knows that it is to be visited by a user, and the latter simply has to signal his presence to restart viewing. Viewing can be restarted using a presence sensor, for example, which simplifies the commands from the user. This variant also has the advantage that the GASD application can determine the playback format that will be required on the new device. If playback requires transcoding, then the application immediately looks for a transcoder. Once the device is found, the GASD application sends it the received document stream, specifying the transcoding and the references of the storage terminal as recipients of the transcoded document. This way, the document is transcoded before being stored. This variant is particularly interesting if the size of the document is smaller when encoded in the second format than in the first format. This way, the size of the temporary storage memory is limited. A refinement of this variant consists in having the GASD application test whether it is more advantageous in terms of memory size to store the document in the first format or in the second format. The GASD application determines on the basis of this whether transcoding is needed before or after storage.

The exemplary embodiment relates to audiovisual documents, but this by no means precludes the invention being applied also to audio documents received, for example, by radio. The audio document encoding formats are, for example, MPEG1, MPEG2(AC3), MP3, MP3 Pro.

Although the present invention has been described with reference to the particular embodiments illustrated, it is by no means limited by these embodiments, but only by the appended claims. It will be noted that changes or modifications may be made by a person skilled in the art.

The invention claimed is:

1. Method of playing back an encoded audiovisual or audio document, comprising the following steps:
    playing back the document received in a first encoding format in a first device of a communication network,
    stopping playback on the first device activating storage of the document in a network device,
wherein it also comprises the following steps:
    entering on a first device an identifier of a second device for continuing playback of the received document,
    testing whether the second device accepts the first encoding format and, if it does not, executing the following two steps:
    searching for a device for transcoding the document from a first encoding format into a second encoding format compatible with the second device,
    activating the transcoding device for transcoding the document in the second format so that it can be played back on the second device,
and on the second device:
    detecting the presence of a user initiating the resumption of playback at the point at which it was stopped.

2. Method of playing back a document according to claim 1, wherein it comprises a comparison step between the sizes of the documents encoded in the first format and in the second format, transcoding being performed before storage when the document encoded in the second format occupies less space than the document encoded in the first encoding format.

3. Method of playing back a document according to claim 1, wherein detecting the presence of a user entails detecting the entry of a command on the second device.

4. Method of playing back a document according to claim 1, wherein if the first device can store, it is chosen in preference for this task.

5. Method of playing back a document according to claim 1, wherein if the same device can store and transcode the document, it is chosen in preference.

6. Method of playing back a document according to claim 1, wherein it comprises two steps for entering user identifiers on the first device and on the second device, playback of the document is resumed on the second device only if the two identifiers are the same.

7. Device for managing a network receiving information indicating that a first device is playing back a document in a first encoding format, wherein it comprises:
    a first means of receiving a command to stop playback of the document on the first device, initiating storage of the document in a network device,
    means of receiving, on the first device, a command to select a second device to continue playback of the document, said device having at least one means of decoding in at least one second format,
    a means of detecting the presence of a user on the second device initiating the resumption of playback at the point at which it was stopped,
    a means of comparing the decoding formats of the second device with the first format,
if the second device does not accept the first encoding format, then the management device searches for a means of transcoding the document from the first encoding into a second encoding compatible with the second device, activates said transcoding means and a means of transmitting the transcoded document to the second device.

8. Device for managing a network according to claim 7, wherein it comprises a means of comparison between the size of the document encoded in the first format and encoded in a second format, the document transcoding means being activated before storage if the size in a second format is smaller.

9. Device for managing a network according to claim 7, wherein the second device includes a means of entering a command, thus confirming the presence of a user.

10. Device for managing a network according to claim 7, wherein it includes a means of transmitting a request to search for a device having storage capabilities for storing the document from the moment at which playback was stopped.

11. Device for managing a network according to claim 7, wherein it includes a means of transmitting a request to search for a device having transcoding capabilities for transcoding from the first encoding format into a second encoding format.

12. Device for managing a network according to claim 10, wherein it includes a means of transmitting a request to search for a device having transcoding capabilities for transcoding from the first encoding format into a second encoding format, and a means of selecting a device having both storage capability and transcoding capabilities for transcoding from the first encoding format to a second encoding format.

13. Device for managing a network according to claim 7, wherein it includes a means of entering a user identifier.

* * * * *